United States Patent
Roy et al.

(10) Patent No.: US 8,590,012 B2
(45) Date of Patent: Nov. 19, 2013

(54) NETWORK ACCESS CONTROL BASED ON PROGRAM STATE

(75) Inventors: Paul Roy, Seattle, WA (US); Khalid Al-Azzawe, Kirkland, WA (US); Cale Carter, Redmond, WA (US); Ambarish Chitnis, Redmond, WA (US); Richard Masao Hawes, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1304 days.

(21) Appl. No.: 11/895,755

(22) Filed: Aug. 27, 2007

(65) Prior Publication Data

US 2009/0064306 A1    Mar. 5, 2009

(51) Int. Cl.
*G06F 17/30* (2006.01)

(52) U.S. Cl.
USPC .................................. 726/3; 726/12

(58) Field of Classification Search
USPC ...................................... 726/3, 12
See application file for complete search history.

(56) References Cited

U.S. PATENT DOCUMENTS

| | | | |
|---|---|---|---|
| 5,889,958 A | 3/1999 | Willens | |
| 5,987,611 A | 11/1999 | Freund | |
| 6,604,136 B1 * | 8/2003 | Chang et al. | 709/223 |
| 6,628,671 B1 | 9/2003 | Dynarski et al. | |
| 6,895,556 B1 * | 5/2005 | Kaply et al. | 715/741 |
| 6,931,530 B2 * | 8/2005 | Pham et al. | 713/165 |
| 7,058,022 B1 * | 6/2006 | Carolan et al. | 370/254 |
| 7,103,587 B2 * | 9/2006 | Lindsay et al. | 1/1 |
| 7,434,257 B2 * | 10/2008 | Garg et al. | 726/21 |
| 7,620,601 B2 * | 11/2009 | Miyawaki | 705/40 |
| 7,711,097 B2 * | 5/2010 | Ji et al. | 379/114.2 |
| 7,844,491 B1 * | 11/2010 | Haitsuka et al. | 705/14.4 |
| 7,886,033 B2 * | 2/2011 | Hopmann et al. | 709/223 |
| 7,895,297 B2 * | 2/2011 | Gorodyansky | 709/219 |
| 8,332,953 B2 * | 12/2012 | Lemieux et al. | 726/26 |
| 2001/0034831 A1 * | 10/2001 | Brustoloni et al. | 713/151 |
| 2002/0002577 A1 * | 1/2002 | Garg et al. | 709/104 |
| 2003/0229779 A1 * | 12/2003 | Morais et al. | 713/153 |
| 2003/0233580 A1 | 12/2003 | Keeler et al. | |
| 2005/0022013 A1 | 1/2005 | Schwenk | |
| 2005/0273849 A1 | 12/2005 | Araujo et al. | |
| 2006/0026670 A1 | 2/2006 | Potter et al. | |
| 2006/0041931 A1 * | 2/2006 | Boxall et al. | 726/4 |
| 2006/0176271 A1 * | 8/2006 | Polivy et al. | 345/156 |
| 2007/0055752 A1 * | 3/2007 | Wiegand et al. | 709/220 |
| 2007/0061197 A1 | 3/2007 | Ramer et al. | |
| 2007/0101406 A1 | 5/2007 | Zavalkovsky et al. | |

(Continued)

OTHER PUBLICATIONS

Virtual Prepaid Tokens for Wi-Fi Hotspot Access; Haidong Xia and Jose Brustoloni; LCN 04; IEEE.*
"Enterasys Switching, Wireless and Management with Microsoft IAS RADIUS Server", Date: 2004, pp. 1-2.
"Mocana Embedded Radius Client", pp. 1-2.

(Continued)

*Primary Examiner* — Edan Orgad
*Assistant Examiner* — James Turchen

(57) ABSTRACT

A gateway controls access to a region of a network by either granting or denying a client machine access to the network region based on whether a particular program is running on the client machine. A program is installed on the client machine which sends a detectable indication that the program is running. When it is detected that the program is running, the gateway allows the client machine access to the network region. When the program is not detected to be running, the gateway denies the client machine access to the network region.

20 Claims, 7 Drawing Sheets

(56) References Cited

U.S. PATENT DOCUMENTS

2007/0150946 A1* 6/2007 Hanberger et al. ............. 726/15
2007/0192652 A1* 8/2007 Kao et al. ......................... 714/4
2007/0297430 A1* 12/2007 Nykanen et al. ............. 370/408

OTHER PUBLICATIONS

Corradi, et al., "Context-Based Access Control for Ubiquitous Service Provisioning", Proceedings of the 28th Annual International Computer Software and Applications Conference, Date: Sep. 28-30, 2004, pp. 444-451, vol. 1.

* cited by examiner

NETWORK ACCESS CONTROL BASED ON PROGRAM STATE

BACKGROUND

Access to a network is sometimes provided under circumstances in which use of certain regions of the network is to be regulated. For example, there may be an Internet access gateway in a public area such as an airport or cafe, and the access provider may initially limit a client's access to what can be called a walled garden. When various conditions are met (e.g., payment of a fee, agreement to legal usage terms, entering a user id and/or password for an existing account, etc.), the user can be given access to the broader Internet.

Another example of a situation in which access may be regulated is in a network for a business or other organization. A user who connects through an access gateway may be given access to different portions of the company's network depending on whether certain security criteria have been met, such as the user's demonstrating employee status, having certain security clearance, etc.

In existing networks, when access to the network is controlled, the conditions for access have typically included making payment, having an account, having employee status, agreement to legal terms, etc., as mentioned above.

SUMMARY

Conditional access to a network can be based on whether a particular program is running on a client machine that is attempting to connect to the network. A program can be installed on the client, and when the client connects at a gateway, the gateway may employ a mechanism to determine whether the client should be allowed continued access to the network (or to a region of the network) based on whether the program is running on the client.

The program may send an initial message to announce its presence. Then, as the program runs, it may generate a heartbeat of messages that are sent to a particular network location, and this heartbeat may be taken as a sign that the program is running on the client. The gateway may employ a mechanism to learn whether the client should be allowed continued access to the network or network region based on whether the program is continuing to run on the client, as indicated by ongoing receipt of the heartbeat. The gateway can communicate with a separate service that monitors the heartbeat, or the gateway can monitor the heartbeat itself. When a separate service is used to monitor the heartbeat, that service can provide recurring updates to the gateway indicating whether the client's access to a network or region continues to be authorized. As another alternative, the service may notify the gateway of changes in the client's authorization status, such as by notifying the gateway that the client's access is no longer authorized when the service detects that the client's heartbeat has been discontinued.

The program that runs on the client may be used to monetize use of a network. For example, the gateway may provide a public wired or wireless Internet access point (such as in an airport, cafe, etc.), and the program may display paid advertisements to a user while the user browses the Internet through that access point. In such a case, the gateway may provide the client with access to either a walled garden or to the Internet, depending on whether the program is running, as a way to enforce the monetization model. As another example, the program may be a security application, and the gateway may provide access to different parts of a network for a corporation (or other kind of organization) depending on whether the security application is running. In addition to these examples, the program could be another type of program and/or could used in a different context.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
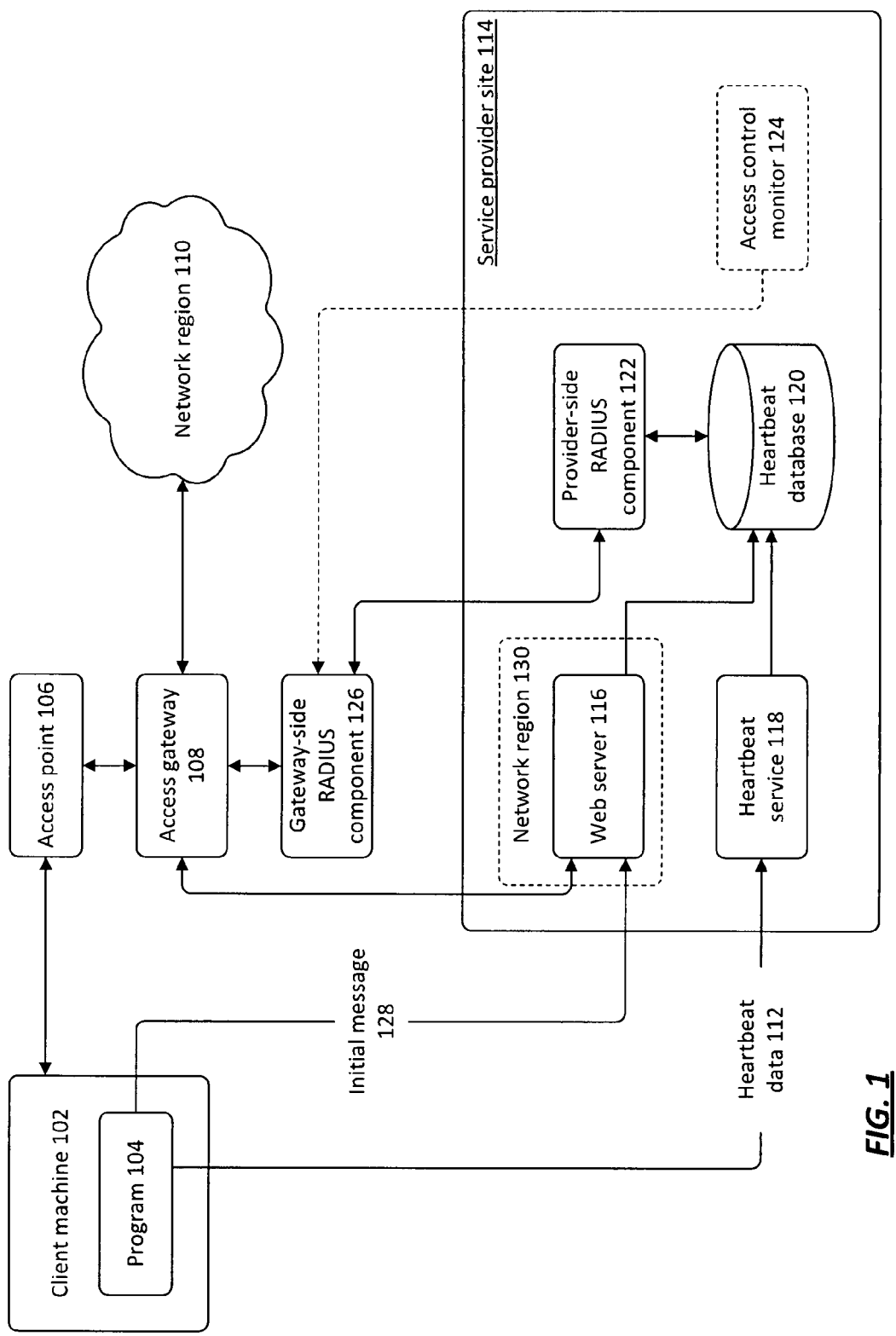
FIG. 1 is a block diagram of a first example scenario in which a client's access to a network region may be controlled.

In FIG. 1, client machine 102 is a device that is to be connected to a network, such as the Internet. Client machine 102 may be a personal computer, such as a desktop, laptop, handheld, etc. Program 104 is a software component that may be installed on client machine 102. Access point 106 is a point through which client machine 102 may connect to a network, and an owner (or other operator) of access point 106 (or an owner or operator of gateway 108 to which access point 106 is connected) may call for program 104 to be installed as a condition of being able to connect through access point 106. In one example, access point 106 is used to implement public Internet access (such as WiFi or Ethernet access in an airport, cafe, hotel, etc.), and program 104 is software that displays advertisements to a user of client machine 102 while that user browses the Internet, thereby providing a way to generate revenue from offering public Internet access. However, the subject matter described herein may be used in scenarios other than monetization of public Internet access. For example, access point 106 may give access to the network of a corporation, a government, or other organization, and program 104 may be a security application that protects data on that network from misuse.

Access point 106 may be a wireless access point, an Ethernet hub, or any type of device that provides connectivity. There may be either one access point 106 as shown in FIG. 1, or more than one access point 106. Access point(s) 106 may be connected to access gateway 108, which mediates access to a network region 110. For example, network region 110 may be the Internet-at-large, and access gateway 108 may control whether client machine 102 has access to the Internet-at-large, or only to certain sites within the Internet. As another example, network region 110 may be one or more secure locations within a corporate intranet, and access gateway 108 may determine whether client machine 102 has access to the secure locations within the corporate intranet.

Access gateway 108 may be configured to grant or deny client machine 102 access to network region 110, based on whether program 104 is running on client machine 102. One way to assist access gateway 108 in determining that program 104 is running is for program 104 to announce its presence and operation by sending an initial message (e.g., initial message 128), and then to demonstrate its ongoing presence and operation by sending a "heartbeat" while it runs. If the heartbeat is detected, and continues to be detected, then it can be inferred that program 104 is running. Conversely, if the heartbeat is not detected, then it can be inferred that program 104 is not running.

The heartbeat can take the form of heartbeat data 112. Heartbeat data 112 may comprise an identification of program 104, which allows a recipient of heartbeat data 112 to recognize heartbeat data as having originated from a particular instance of program 104. Each instance of program 104 can be configured with an identifier that distinguishes different instances of program 104 from each other, and these different instances are installed on different machines. As another example, heartbeat data 112 may comprise an identification of the particular client machine 102 on which program 104 is running. FIG. 1 shows program 104 sending heartbeat data 112 to service provider site 114, which is discussed below, although program 104 could send heartbeat data 112 to a different location (such as to access gateway 108, as discussed below in connection with FIG. 7).

Program 104 may send heartbeat data 112 to service provider site 114. A service provider that operates site 114 may be an entity through with network access is provided. For example, the service provider may be an Internet Service Provider (ISP), and access point 106 and access gateway 108 may be owned or operated by the service provider. (As another example, an entity other than the service provider may own access point 106 and/or access gateway 108, and may use these components to provide network access under agreement with the service provider.) Service provider site 114 includes components that are used as part of the process of providing client machine 102 with access to a network, and/or controlling client machine 102's access to the network. These components may include a web server 116, a heartbeat service 118, a heartbeat database 120, a provider-side RADIUS ("Remote Authentication Dial In User Service") component 122, and/or an access control monitor 124.

Web server 116 provides one or more web pages. Access gateway 108 may grant client machine 102 access to web server 116 (as indicated by the double-ended arrow connecting access gateway 108 with web server 116) even if it has not given client machine 102 access to network region 110. (Web server 116 can be viewed as being part of network region 130, which may be different from network region 110.) Thus, web server 116 may be accessible via the Internet, but access gateway 108 may limit client machine's 102 Internet access to being able to access web server 116, or some subset of the Internet that includes web server 116. (In this example, network regions 110 and 130 may be viewed as being different regions of the Internet to which access can be separately allowed.) Thus, web server 116 may implement a "walled garden" to which client machine 102's Internet access is limited until certain conditions are fulfilled. Expecting client machine 102 to run program 104 before being allowed access to network region 110 is an example of such a condition. For example, web server 116 may provide a page to client machine 102 which, when viewed on a browser, solicits the user's agreement to legal terms or conditions, solicits payment from a user, assists the user in downloading and/or installing program 104, etc. When program 104 has been installed on client machine 102, program 104 may send an initial message 128 to web server 116 announcing program 104's presence and/or operation. (Program 104 can also be configured to send initial message 128 when there is a change in connection status, when program 104 detects that it is in a walled garden, etc.) Initial message 128 may be sent to web server 116 through access gateway 108. Initial message 128 may, for example, include program 104's distinguishing identifier and/or a password (which may be hashed, signed, etc.). Web server 116 may authenticate initial message 128 (e.g., in order to distinguish an initial message sent by program 104 from a message sent by an imposter program) by recognizing portions of initial message 128 (e.g., the password, the distinguishing identifier, etc.), and may then inform gateway 108 that client machine 102 may be granted access to region 110. Web server 116 may also update heartbeat database to reflect the presence of client machine 102—e.g., by establishing a record in heartbeat database 120, which can then be updated as heartbeats are received.

Heartbeat service 118 receives the heartbeat data 112 that program 104 sends to service provider site 114. Heartbeat service 118 may authenticate the received data to determine that heartbeat data 112 was actually sent by program 104 instead of by an imposter. Heartbeat service 118 may store a record relating to heartbeat data 112 in heartbeat database 120. For example, when heartbeat data is received, heartbeat service 118 may store, in heartbeat database 120, an indication of which client machine 102 the heartbeat data was received from. If individual instances of program 104 are distinguishable (e.g., if different instances of program 104 have distinguishing identifiers that are contained in heartbeat data 112, then these distinguishing numbers can be recorded in heartbeat database 120). Additionally, a timestamp reflecting when heartbeat data 112 was received can be stored in heartbeat database 120. Heartbeat database 120 thus may contain a record from which it can be determined whether a heartbeat is continually being received from a particular client machine 102.

Service provider site 114 communicates, to access gateway 108, information about whether client 102 is authorized to access network region 110 based on whether a heartbeat is being received from client machine 102. Service provider site 114 can communicate this information to access gateway 108 in various ways. In one example, access gateway 108 may recurrently query service provider site 114 to determine whether client machine's access to network region 110 continues to be authorized. Service provider site 114 can then determine, by examining the data stored in heartbeat database 120, whether a heartbeat continues to be received from the client, and, depending on analysis of the data, can respond to the query by indicating that access is still authorized or should be discontinued. As another example, service provider site 114 may monitor heartbeat database 120 to determine whether a heartbeat is continuing to be received from client machine 102, and can notify access gateway 108 of a change in authorization status—e.g., if a heartbeat was being received for some time and then appears to have ceased, service provider site 114 can notify access gateway 108 that the heartbeat has ceased and/or that access to network region 110 is no longer authorized.

One way to facilitate this communication is through the RADIUS protocol. RADIUS is a standard that relates to the communication of authentication and authorization information. Access gateway 108 may have, or use, a gateway-side RADIUS component 126, and service provider site 114 may have, or use, a provider-side RADIUS component 122. (Communication between the gateway-side and provider-side RADIUS components is shown by the double-sided arrow connecting components 122 and 126.) These components communicate information about authorization decisions, and other information, according to the RADIUS standard. Gateway-side RADIUS component 126 may be configured to send queries, recurrently, to provider-side RADIUS component 122 as to whether client machine 102's access to network region 110 should continue to be allowed. When provider-side RADIUS component 122 receives these queries, it may examine heartbeat database 120 to determine whether a heartbeat has been received recently for client machine 102. (As noted above, there may be several client machines 102, and heartbeat database 120 may store information from which it can be determined which of the various client machines have sent a heartbeat.) For example, program 104 may be configured to send heartbeat data 112 at particular time intervals, and provider-side RADIUS component 122 may check heartbeat database 120 to determine whether a heartbeat was received from a particular client machine 102 within the expected time interval. Provider-side RADIUS component 122 may then inform gateway-side RADIUS component 126 that client machine 102 is no longer authorized, thereby causing gateway 108 to disallow client machine 102's continued access to network region 110.

As an alternative to having the gateway issue queries to service provider site 114, service provider site 114 may have, or use, an access control monitor 124, which monitors heartbeat database 120 to determine whether heartbeats continue to be received from client machine 102. If access control monitor 124 determines that heartbeats have ceased to be received from client machine 102, then access control monitor 124 can send, to access gateway 108, a message indicating that client machine 102 is no longer authorized, and gateway 108 can discontinue client machine 102's access to network region 110 on the basis of this message. The message from access control monitor 124 can be sent using RADIUS (e.g., access control monitor can cause provider-side RADIUS component 122 to send a message to gateway-side RADIUS component 126). Or, as another example, access control monitor 124 can send the message directly to access gateway 108. A callback is one example of a mechanism though which such message can be sent—e.g., gateway-side RADIUS component 126 or gateway 108 may expose callbacks that a component associated with service provider site 124 can invoke to report a change in client machine 102's authorization status.

It should be noted that program 104 may have statuses other than "running" or "not running." For example, program 104 may have different modes of operation, and may perform different actions depending on which mode program 104 is operating in. The heartbeat data 112 generated by program 104 may indicate which mode program 104 is operating in, and this information can be stored in heartbeat database 120. Program 104's operating in a certain mode may be a condition of allowing client machine 102's access to network region 110. Thus, instead of (or in addition to) determining whether program 104 is operating, the components discussed above may determine whether program 104 is operating in a certain mode. For example, provider-side RADIUS component 122, or access control monitor 124, may make decisions about authorization status based on whether program 104 has reported, in its heartbeats, that it is operating in a certain mode. Thus, a decision as to whether client machine 102 is allowed to access network region 110 can be based on whether one or more criteria are met. Whether program 104 is running at all, and whether program 104 is running in a certain mode, are both examples of such criteria, although there are other examples.

FIGS. 2-7 show various example processes. These processes are described, by way of example, with reference to components shown in FIG. 1, although these processes may be carried out in any system and are not limited to the scenario shown in FIG. 1. Additionally, each of the flow diagrams in FIGS. 2-7 shows an example in which stages of a process are carried out in a particular order, as indicated by the lines connecting the blocks, but the various stages shown in these diagrams can be performed in any order, or in any combination or sub-combination.

Figure 2:
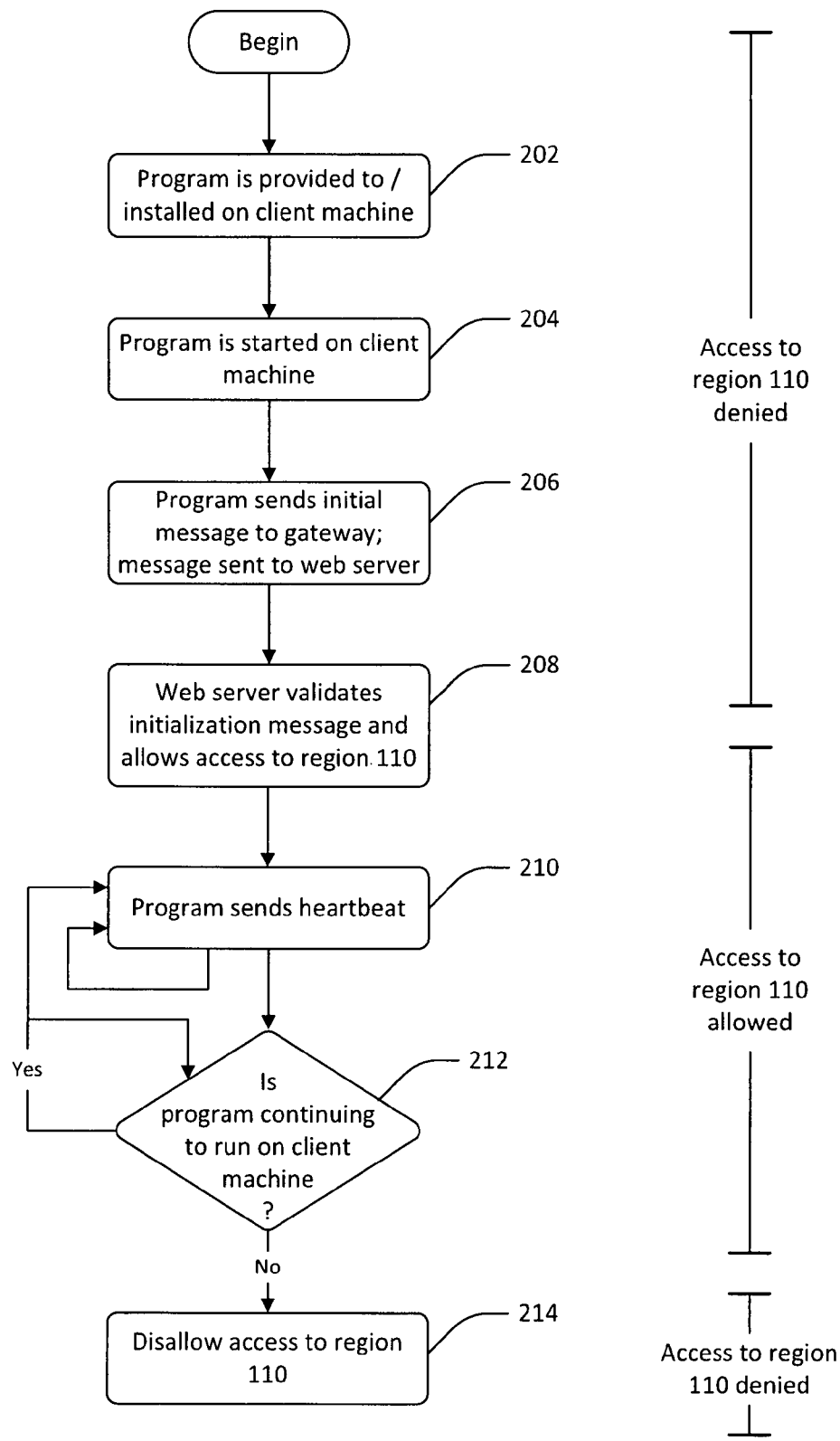
FIG. 2 is a flow diagram of an example process in which a client machine is granted or denied access to a network region.

FIG. 2 shows an example process in which a client machine may be allowed or denied access to a network region. At 202, a program (e.g., program 104, shown in FIG. 1) is provided to and/or installed on a client machine. The client machine is a device that is to be connected to a network through a particular access point and/or gateway (e.g., as in the case where client machine 102 obtains network access through access point 106 and gateway 108, as shown in FIG. 1). At 204, the program is started. At 206, the program sends an initial message, which may be sent to a service provider's site (e.g., to web server 116, shown in FIG. 1) through the gateway. The service provider's site may validate the initial message and then inform the gateway to allow access (at 208). (The initial message also announces the client machine's presence on the network, which may cause the service provider's site to start listening for that machine's heartbeat. For example, the initial message may cause a record of a particular client machine to be established in a heartbeat database, which can then be updated by a heartbeat monitor as heartbeats are received from that client machine.) If access to a particular network region (e.g, network region 110, shown in FIG. 1) has been denied up to the beginning of 208, access to that region may now be granted.

At 210, the program sends a heartbeat, which is received at an appropriate location (e.g., at heartbeat service 118, shown in FIG. 1). The process of sending a heartbeat may recur. For example, a heartbeat may be sent repeatedly at particular time intervals, although these intervals can be regular or irregular.

At 212, a determination is made as to whether the program is continuing to run on a client machine, or is continuing to run in a particular mode (at 212). This determination may be made, for example, by an appropriate component checking heartbeat database to determine whether a heartbeat has been received sufficiently recently. However, the determination as to whether the program is running, or is running in a particular mode, can be made in other ways. If the program is running (or is running at a particular mode), then access to network region 110 continues to be allowed, but otherwise access to network region 110 is denied (at 214).

It should be noted that the sending of a heartbeat, and the check as to whether the heartbeat is being sent, may occur independently of each other, and thus may occur in no particular order, or in any order. The various arrows leading outward from 210 and 212 show that, at any given point in time after these stages occur, the next stage could be sending a heartbeat, checking whether the program in question is running, or any other action.

Figure 3:
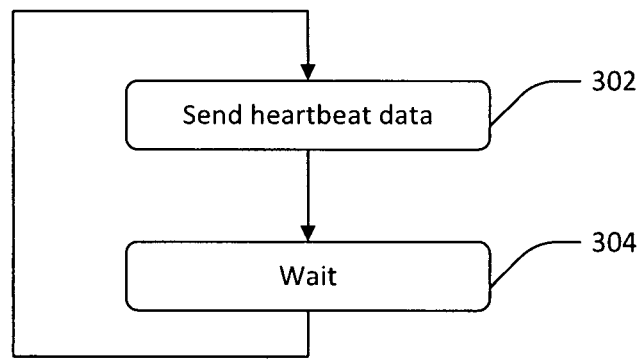
FIG. 3 is a flow diagram of an example process of sending a heartbeat.

FIG. 3 shows a process of sending a heartbeat. At 302, the program sends heartbeat data to an appropriate location. At 304, the program waits. The wait may be a fixed amount of time, so that heartbeats are sent at regular intervals, but the wait may also be a variable amount of time. After the wait, the program returns to 302 to send another heartbeat.

Figure 4:
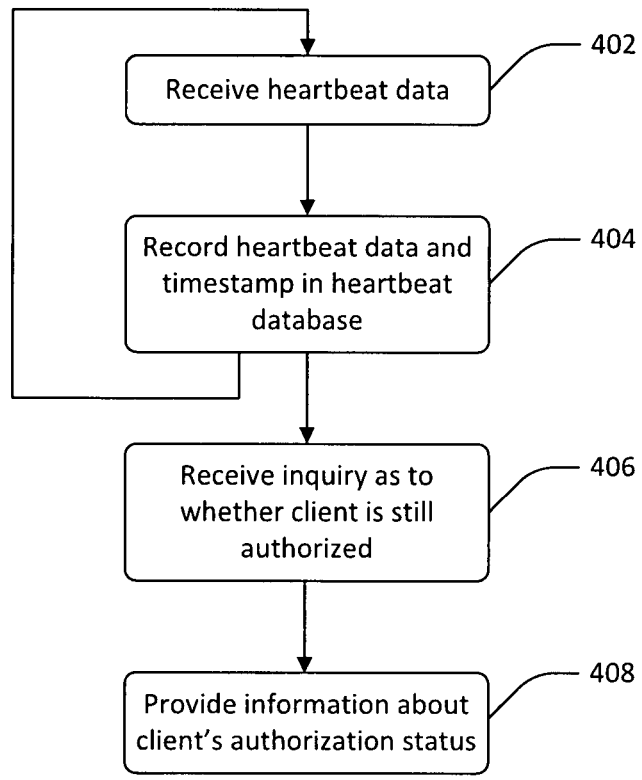
FIGS. 4, 5, 6, and 7 are flow diagrams of example processes that may be performed with respect to a service provider site and/or a gateway.

FIG. 4 shows a first example process in which heartbeat data is received. At 402, a component (such as heartbeat service 118, shown in FIG. 1) waits for and/or receives heartbeat data. At 404, the heartbeat data and a timestamp are recorded in a heartbeat database. This portion of the process may be repeated, as indicated by the arrow looping back to 402. At some point (as indicated by the arrow leading from 404 to 406), an inquiry is made as to whether a particular client is still authorized for network access. It is determined whether the heartbeat is currently being received from a particular instance of a program running at a particular client machine, and, based on this determination, the client's authorization status is then provided (at 408). The process shown in FIG. 4 may be performed, for example, using RADIUS components 122 and 126 (shown in FIG. 1)—e.g., the provider-side RADIUS component may receive an inquiry as to whether a program is still authorized to access a particular network region, and may then analyze information stored in a heartbeat database and provide a result of that analysis to the gateway-side RADIUS component. However, the process shown in FIG. 4 may be performed by or with respect to any components.

Figure 5:
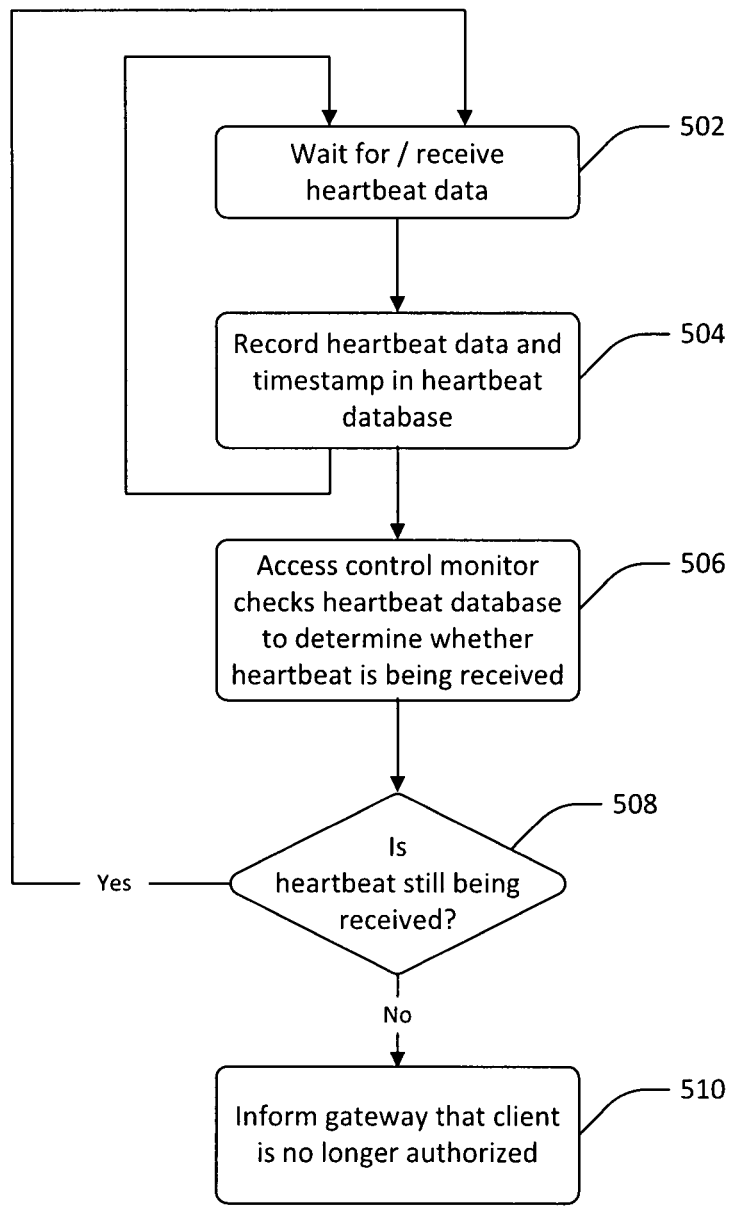

FIG. 5 shows a second example process in which heartbeat data is received. At 502, a component (such as heartbeat service 118, shown in FIG. 1) waits for and/or receives heartbeat data. At 504, the heartbeat data and a timestamp are recorded in a heartbeat database. This portion of the process may be repeated, as indicated by the arrow looping back to 502. At some point (as indicated by the arrow leading from 504 to 506), a check is made (e.g., by access control monitor 124, shown in FIG. 1) to determine whether heartbeat data is continuing to be received from a particular instance of a program running at a particular client machine. If the heartbeat is continuing to be received (as determined at 508), the process continues to perform the stages shown at 502, 504, and 506. (FIG. 5 shows an arrow leading from 508 to 502. However, following a "yes" determination at 508, the stages shown at 502, 504, and 506 may be performed in any order, combination, or sub-combination.) If it is determined at 508 that the heartbeat is not being received, then a message is sent to the gateway indicating that the client machine is no longer authorized (at 510).

Figure 6:
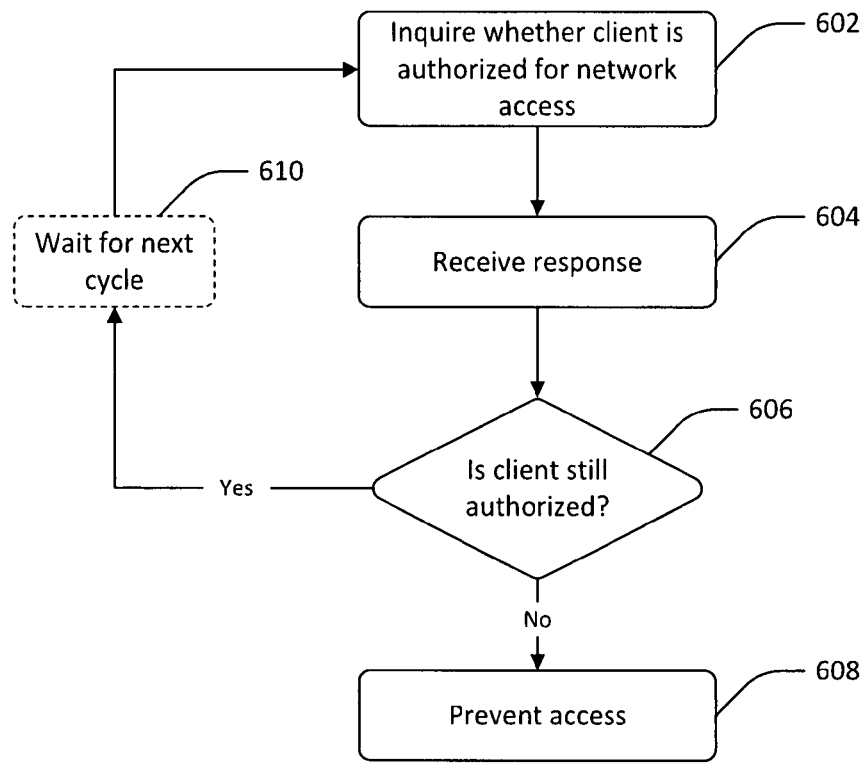

FIG. 6 shows a process that may be performed at a gateway. As described above in connection with FIG. 4, a provider-side RADIUS component may receive an inquiry as to whether a client continues to be authorized for network access. FIG. 6 shows a process by which a gateway may generate that inquiry and receive the response. At 602, an inquiry is made as to whether a particular client continues to be authorized for network access. At 604, a response is received, and the response may be generated based on whether a heartbeat continues to be received from that client. If the client is still authorized as indicated by the response (at 606), then the process proceeds to wait for some amount of time (at 610), and then returns to inquire again whether the client continues to be authorized. If it is determined at 606 that the client is no longer authorized, then access to a network region (e.g., network region 110, shown in FIG. 1) is prevented (at 608).

Figure 7:
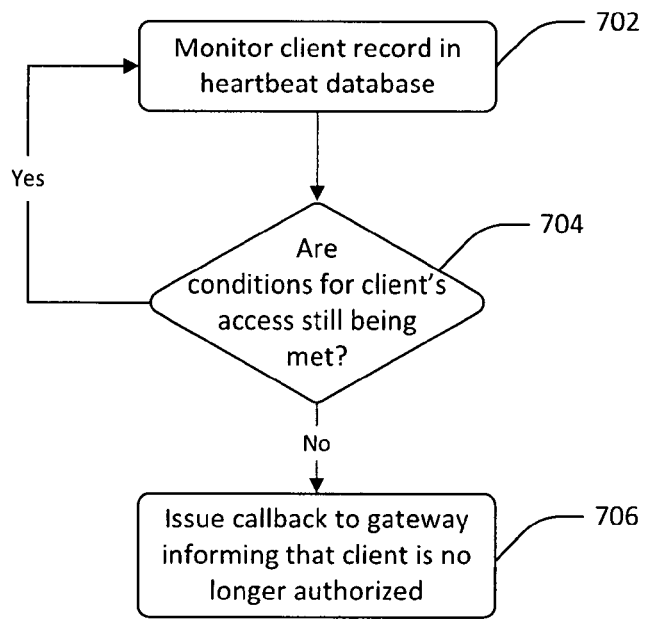

FIG. 7 shows an example process in which a heartbeat database may be monitored, and a gateway may be informed of a change in authorization status. At 702, a particular client's record(s) in heartbeat database is (are) monitored. At 704, a determination is made as to whether conditions for the client's continued access are still being met. For example, the determination may include factors such as whether a heartbeat has been received from that client within a particular amount of time, or whether the heartbeats show that the program running at that client is operating in a particular state. If it is determined at 704 that conditions for the client's continued access are still being met, then the process returns to 702 to continue to monitor the client's record(s) in the heartbeat database. On the other hand, if it is determined at 702 that conditions for the client's continued access are not being met, then a callback is issued (at 706) informing the gateway that the client's access is no longer authorized. As previously noted, the gateway can learn of the client's authorization status, for example, by querying the service provider's site, or by having the service provider's site inform the gateway of a change in the client's authorization status. FIG. 6 can be viewed as a way of carrying out the former of these techniques, and FIG. 7 can be viewed as a way of carrying out the latter of these techniques, although the processes shown in FIGS. 6 and 7 could be performed in any context.

Figure 8:
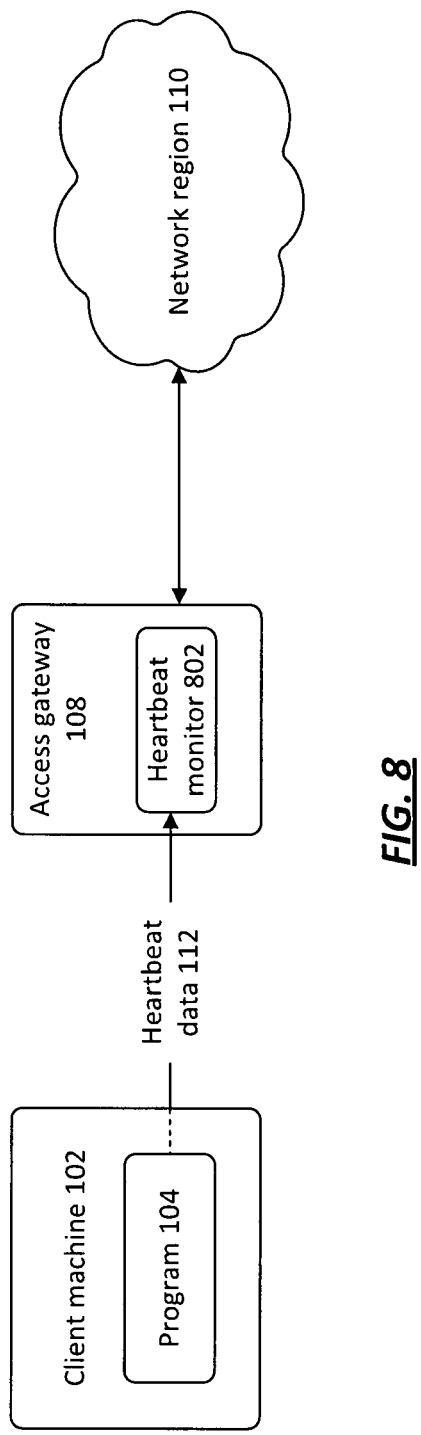
FIG. 8 is a block diagram of a second example scenario in which a client's access to a network region may be controlled.

FIG. 8 shows an example scenario in which a client's access to a network region may be controlled. As described above with reference to FIG. 1, a program may send heartbeat data to a service provider site, and a gateway may learn from the service provider site whether the program is still authorized for network access. However, as shown in FIG. 8, the program can send the heartbeat to the gateway, and the gateway can make the determination of whether the program is still running (and therefore whether access is still authorized) based on the gateway's receipt (or non-receipt) of the heartbeat. In FIG. 8, program 104 runs on client machine 102. Access gateway 108 mediates access to network region 110. Program 104 sends heartbeat data 112 to access gateway. Access gateway 108, in the example of FIG. 8, includes a heartbeat monitor 802, which receives heartbeat data 112, and makes decisions, based on receipt or non-receipt of heartbeat data 112, as to whether access gateway 108 should allow or deny client machine 102 access to network region 110.

Figure 9:
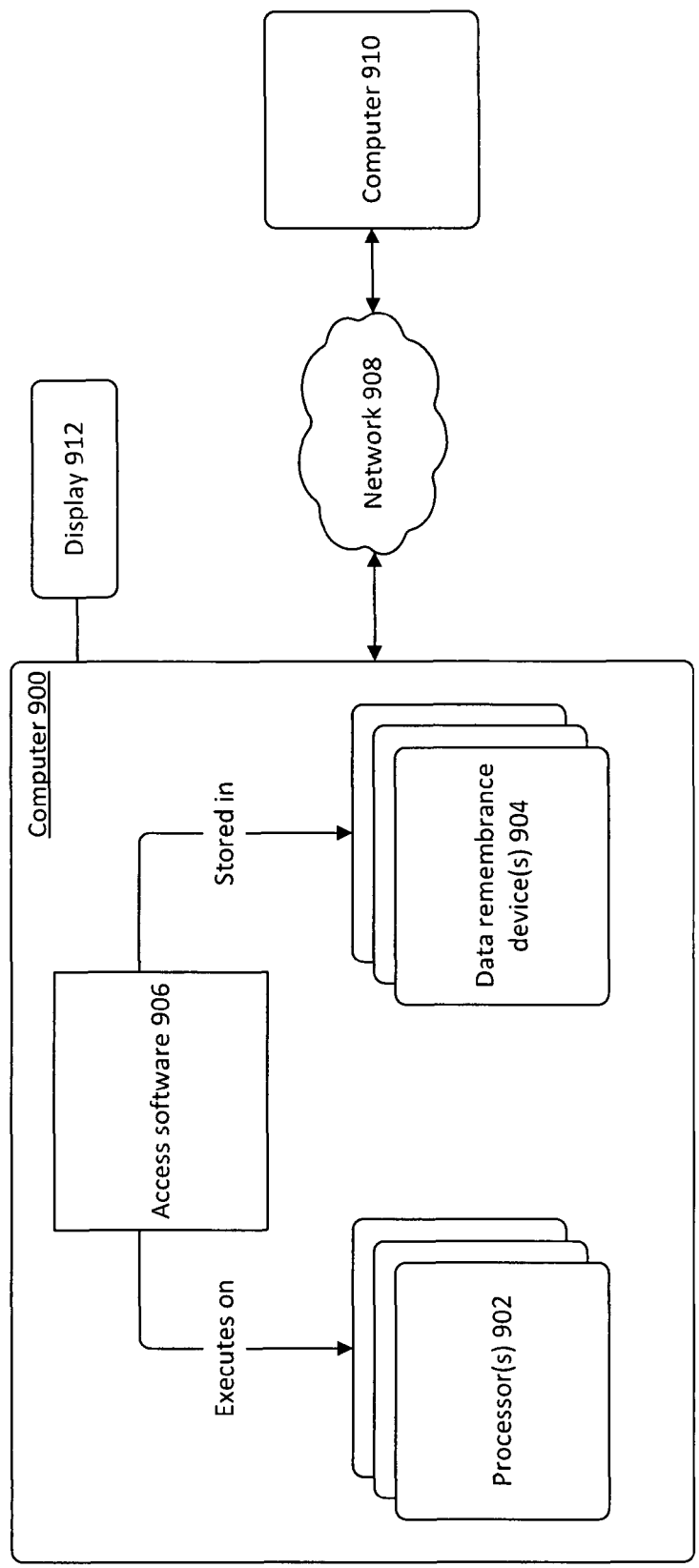
FIG. 9 is a block diagram of example components that may be used with implementations of the subject matter described herein.

FIG. 9 shows an example environment in which aspects of the subject matter described herein may be deployed.

Computer 900 includes one or more processors 902 and one or more data remembrance devices 904. Processor(s) 902 are typically microprocessors, such as those found in a personal desktop or laptop computer, a server, or a handheld computer. Data remembrance device(s) 904 are devices that are capable of storing data for either the short or long term. Examples of data remembrance device(s) 904 include hard disks, removable disks (including optical and magnetic disks), volatile and non-volatile random-access memory (RAM), all types of read-only memory (ROM), flash memory, magnetic tape, etc. Data remembrance device(s) are examples of computer-readable storage media. Computer 900 may comprise, or be associated with, display 912, which may be a cathode ray tube (CRT) monitor, a liquid crystal display (LCD) monitor, etc.

Software may be stored in the data remembrance device(s) 904, and may execute on the one or more processor(s) 902. An example of such software is access software 906, which may implement some or all of the functionality described above in connection with FIGS. 1-8. Software 906 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 9, although the subject matter described herein is not limited to this example.

The subject matter described herein can be implemented as software that is stored in one or more of the data remembrance device(s) 904 and that executes on one or more of the processor(s) 902. As another example, the subject matter can be implemented as software having instructions to perform one or more acts, where the instructions are stored on one or more computer-readable storage media.

In a typical environment, computer 900 may be communicatively connected to one or more other devices through network 908. Computer 910, which may be similar in structure to computer 900, is an example of a device that can be connected to computer 900, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage device comprising executable instructions to perform a method of controlling access, the method comprising:
   granting a machine access to a first region of a network;
   determining that a program that meets one or more criteria is running on said machine; and
   based on said determining, granting said machine access to a second region of said network, wherein said program sends data, while said program operates, to a site that is in said network, outside of said second region, and separate from a gateway through which said machine connects to said network, and wherein said determining comprises:
   sending an inquiry to said site; and
   receiving, from said site in response to said inquiry, a message that indicates: (a) that an initial message was received at said site from said program, (b) that said data is continually being received by said site from said program, (c) that said program is running, and (d) that access to said second region is to be granted to said machine, said site authenticates said initial message to distinguish said initial message sent by said program from a message sent by an imposter program,
   said method further comprising:
   subsequent to said receiving of said message from said site, said site receiving a callback that is exposed by a first component that performs said method, said site invoking said callback to indicate that conditions under which said machine is to be granted access are no longer being met, said callback being a mechanism that is exposed by said first component, said callback being invocable by a second component to report a change in said machine's authorization status, said second component being associated with a service provider.

2. The one or more computer-readable storage media of claim 1, wherein said program sends data while said program operates, and wherein said determining is based on a finding that said data is being sent.

3. The one or more computer-readable storage media of claim 2, wherein said finding is based on said data's having been sent within an amount of time.

4. The one or more computer-readable storage media of claim 1, wherein said message is received by a RADIUS component that determines whether said gateway is to grant said machine access to said second region.

5. The one or more computer-readable storage media of claim 1, wherein said determining comprises:
   receiving, from said site, a message indicating that said program has changed from a state in which said one or more criteria are met to a state in which said one or more criteria are not met.

6. The one or more computer-readable storage media of claim 1, wherein said one or more criteria comprise said program's being running.

7. The one or more computer-readable storage media of claim 1, wherein said program sends data while said program operates, wherein said one or more criteria comprise said program's being running in a particular one of said plurality of modes, and wherein said data comprises an indication of which of said plurality of modes said program is running in.

8. The one or more computer-readable storage media of claim 1, wherein said program sends data while said program operates, wherein said program comprises an identifier that distinguishes different instances of said program from each other, and wherein said data comprises said identifier.

9. A system comprising:
   one or more processors;
   one or more data remembrance devices;
   software that is stored in one or more of said data remembrance devices and that executes on one or more of said processors, said software comprising:
   a first component that receives heartbeat data from a program that runs at a first device, said first component storing said heartbeat data, and a timestamp indicating a time at which said heartbeat data is received by said first component, in a database that is stored in one or more of said data remembrance devices; and
   a second component that makes a determination based at least in part on whether said heartbeat data has been received from said program within an amount of time and that, based on said determination, either (a) instructs a second device either to grant or to deny said first device access to a network region; or (b) informs said second device as to whether said heartbeat data is being received from said program; and
   a server that communicates with said first device through said second device, said server communicating with said first device irrespective of whether said second device allows said first device access to said network region, said network region comprising said server and at least one location other than said server, the system receiving an inquiry from said second device; and instructing of said second device to grant or deny said first device access to said network region, or informing of said second device as to whether said heartbeat data is being received from said program, being done by said second component in response to said inquiry, said second component instructing said second device to deny said first device access to a network region by issuing a callback exposed by said second device, said callback being a mechanism that is exposed by said second device, said callback being invocable by said second component to report a change in said first device's authorization status, said second component being associated with a service provider.

10. The system of claim 9, wherein said software further comprises:
    a third component that implements a RADIUS protocol or a portion of said RADIUS protocol, said second component instructing or informing said second device through said third component.

11. The system of claim 9, wherein said second component makes said determination further based on an identifier of an instance of said program, said heartbeat data comprising said identifier.

12. The system of claim 9, wherein said second component makes said determination further based on an indication of a mode in which said program is running, said heartbeat data comprising said indication.

13. A method of controlling use of a gateway, the method comprising:
   providing, to a device, a program that sends data over a network while said program is running;
   receiving, from said program, said data while said program is running;
   determining that said data has ceased being received; and
   based on said determining, sending a message to the gateway that either (a) informs the gateway that said program is not running on said device, or (b) instructs the gateway to deny said device access to a region of said network, said message being sent by issuing a callback exposed by said gateway, said callback being a mechanism that is exposed by said gateway, said callback being invocable by a component that performs said method to report a change in said device's authorization status, said component being associated with a service provider,
wherein said region is the Internet, receiving and said sending are performed by a server that is in said region, and wherein said program communicates with said server even when said gateway has denied said device access to the Internet, said program displaying advertisements on a display while said program runs.

14. The method of claim 13, wherein said data is sent recurrently while said program is running, and wherein the method further comprises:
   storing said data in a database with a timestamp indicating when said data has been received; and
   monitoring said database to determine whether said data is continuing to be received;
wherein said determining is based on said monitoring.

15. The method of claim 13, wherein said program comprises an identifier that distinguishes different instances of said program from each other, and wherein said data comprises said identifier.

16. The method of claim 13, wherein said program sends a message upon startup, and wherein the gateway allows said device access to said region of said network from a time after said message is sent until the gateway has been informed that said program is not running on said device or has been instructed to deny said device access to said region of said network.

17. The one or more computer-readable storage media of claim 1, wherein said site is not in said first region of said network, wherein said gateway determines whether to allow or to deny access to said second region, and wherein said program, which is running on said machine, communicates with said site irrespective of whether said gateway allows or denies said device access to said second region.

18. The method of claim 9, wherein said network region is the Internet, wherein said second device grants or denies said first device access to the Internet, and wherein said server communicates with said first device even if said second device has denied said first device access to the Internet.

19. The system of claim 9, said first component further receiving an initial message from said program, said second component authenticating said initial message to distinguish said initial message from a message sent by an imposter program.

20. The method of claim 13, further comprising:
   receiving an initial message from said program, said program being operable in a plurality of modes that include a state other than running and a state other than not-running;
   authenticating said initial message to distinguishing said initial message from a message sent by an imposter program.

* * * * *